United States Patent [19]

Snapp, Jr. et al.

[11] 3,929,847

[45] Dec. 30, 1975

[54] ETHER DIESTER DERIVATIVES OF P-DIOXANONE

[75] Inventors: Thomas C. Snapp, Jr.; Alden E. Blood, both of Longview, Tex.

[73] Assignee: Eastman Kodak Company, Rochester, N.Y.

[22] Filed: Sept. 25, 1974

[21] Appl. No.: 508,314

[52] U.S. Cl. .......... 260/410.6; 260/476; 260/484 A
[51] Int. Cl.² ........................................ C09F 5/08
[58] Field of Search ............. 260/410.6, 484 A, 476

[56] References Cited
UNITED STATES PATENTS

| | | | |
|---|---|---|---|
| 2,962,455 | 11/1960 | Hostettler | 260/484 A |
| 3,086,044 | 4/1963 | Kerschner | 260/484 A |
| 3,499,028 | 3/1970 | McTeer | 260/484 A |
| 3,565,946 | 2/1971 | Feng | 260/484 A |
| 3,689,531 | 9/1972 | Critchfield | 260/484 A |
| 3,767,627 | 10/1973 | Schoen | 260/484 A |
| 3,776,766 | 12/1973 | Smerz | 260/410.6 |

Primary Examiner—Winston A. Douglas
Assistant Examiner—John F. Neibling
Attorney, Agent, or Firm—Edward R. Weber; Daniel B. Reece III

[57] ABSTRACT

This invention relates to a new series of ether-diester derivatives of p-dioxanone having the formula

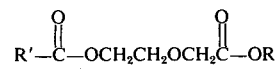

wherein R' is alkyl of from 1 to 7 carbon atoms or the phenyl moiety and R is alkyl of from 1 to 8 carbon atoms. These novel compounds are produced by reacting p-dioxanone with an aliphatic alcohol having from 1 to 8 carbon atoms and esterifying the reaction product with an aliphatic carboxylic acid having from 2 to 8 carbon atoms or a corresponding acid anhydride. Benzoic acid or its anhydride yields the phenyl moiety in the ether-diester derivatives. The ether-diesters are particularly useful as plasticizers for polyvinyl chloride.

21 Claims, No Drawings

ETHER DIESTER DERIVATIVES OF P-DIOXANONE

This invention relates to a new family of chemical compounds, namely ether-diester derivatives of p-dioxanone. The new compounds have the following structural formula:

wherein R is alkyl of from 1 to 8 carbon atoms and R' is alkyl of from 1 to 7 carbon atoms or the phenyl moiety.

The novel ether-diesters described herein result from the selective reaction of p-dioxan-2-one (p-dioxanone) with various aliphatic alcohols to yield an intermediate hydroxy ether-ester which can then be esterified. The highly selective reaction of p-dioxan-2-one with an alcohol is unexpected, since transesterification of the hydroxyetherester product with p-dioxanone could readily occur and p-dioxanone self-condensation would be a predicted side reaction. Neither the transesterification nor the self-condensation reaction is encountered in the synthesis of the ether-diesters.

The novel ether-diesters of this invention exhibit good utility in a broad range of applications. They have been found to be particularly effective plasticizers for polyvinyl chloride resin. The plasticizer properties of these compounds are characterized by good volatility and low temperature flexibility. Other application areas in which these compounds are useful include viscosity improvers for motor oil and brake fluid; and solvents in waxes, polishes and lubricants.

The novel ether-diesters are prepared by a two-step reaction sequence. It is believed that the reaction proceeds according to the following equations:

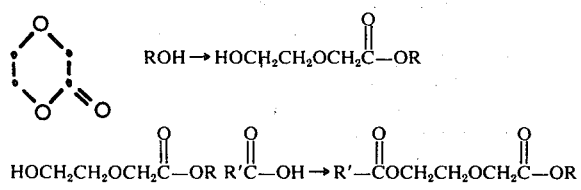

In the first step, an aliphatic alcohol is reacted with the p-dioxanone to afford nearly quantitative yields of alkyl beta-hydroxyethoxyacetate. This reaction is accomplished with an acid or basic catalyst to accelerate the reaction rate. Suitable catalysts for this reaction include sulfuric acid, organotin compounds (dibutyltin oxide, dibutyltin dilaurate, etc.), hydrochloric acid, zinc chloride, p-toluenesulfonic acid, pyridine, aliphatic tertiary amines, alkali metal hydroxides and N,N-dimethylaniline. However, the desired product can be produced in a noncatalyzed reaction between the two reactants. If catalysts are used, the catalyst concentration of from about 0.01 to about 2.0 weight percent, based on the total reactant weight, should be employed. A preferred catalyst concentration for this reaction is 0.1–1.0 weight percent of the total reactant weight. The reaction temperature at this stage should be from about 50°C. to about 150°C. The reaction can be conducted at a greater than atmospheric pressure without detrimental effects to the product. A mole ratio of alcohol to lactone can be from about 1:1 to about 15:1, respectively. A preferred ratio of reactants is from about 2:1 to about 7:1, respectively. The alcohol must be aliphatic and have a carbon skeleton of from 1 to 8 carbon atoms. Alcohols of particular importance are methanol, ethanol, propanol, n-butanol, isobutanol, 2-methylpentanol-1, 2-hexanol, 2-ethylhexanol-1, n-octanol, allyl alcohol and crotonyl alcohol.

The second step of the reaction sequence is the esterification of the intermediate alkyl beta-hydroxyethoxyacetate. Esterification of the hydroxylated ether-ester can be accomplished by reaction with either a carboxylic acid or an acid anhydride. The carboxylic acid or anhydride is aliphatic in nature with a carbon chain of from 2 to 8 carbon atoms or aromatic with the phenyl moiety. The mole ratio of hydroxylated ester to acid moiety should be from about 1.0:1.0 to about 1.0:3.0, respectively, to insure complete esterification of the p-dioxanone diester derivative.

Esterification with an anhydride is achieved with or without catalysis at temperatures of from about 50°C. to about 150°C. However, esterification with the carboxylic acid requires a low concentration (from about 0.01 to about 1.0 weight percent based on total weight of the reactant) of acid catalyst to produce the desired diester product. Suitable acid catalysts are methanesulfonic acid, p-toluenesulfonic, phosphoric acid, sulfuric acid, hydrochloric acid, and zinc chloride. An azeotropic agent such as benzene, toluene, or hexane is useful to aid water removal during the reaction. Esterification temperatures with the acid should be from about 50°C. to about 200°C.

The novel ether-diesters are viscous, colorless liquids or low melting solids which can be distilled at reduced pressure without decomposition. Variation in physical properties (water and organic solubilities) can be readily obtained by modification of the carbon skeleton of the alcohol or acid utilized. This available range of properties renders these products particularly useful as coalescing agents and plasticizers in coating and resin applications.

The process of the invention is illustrated in greater detail by the following examples which are all conducted at atmospheric pressure, but it will be understood that these examples are not intended to limit the invention in any way and obvious modifications will occur to those skilled in the art.

EXAMPLE 1

This example demonstrates the synthesis of an ether-diester of p-dioxan-2-one by the noncatalyzed reactions of an aliphatic alcohol, p-dioxan-2-one, and an acid anhydride. In this example a one-liter, four-neck flask is fitted with a stirrer, dropping funnel, thermometer, and condenser with an attached nitrogen blanket. The flask is charged with 192 grams (6.0 moles) of methanol and heated to 50°C. Freshly distilled p-dioxan-2-one (204 grams, 2.0 moles) is slowly added over a 30 minute period. After the addition is complete, the reaction mixture is stirred for 3 hours. Excess methanol is removed by evaporation in vacuo to give a viscous, colorless liquid, methyl beta-hydroxyethoxyacetate, in a 95 percent yield. To this product, heated at 50°C., is slowly added 214 grams (2.1 moles) of acetic anhydride. After stirring and heating at 75°C. for 5 hours, the mixture is submitted to fractional distillation at atmospheric pressure. The main fraction boils at 188°–190°C. and is identified as methyl beta-acetoxyethoxyacetate. Yield to this ether-diester is 93 percent. Structural determination is substantiated by infrared and NMR spectroscopy. Saponification equivalent of the product is 86 (theoretical is 88.1).

EXAMPLE 2

This example demonstrates the synthesis of an ether-diester by the catalyzed reaction of p-dioxan-2-one with an aliphatic alcohol to yield the hydroxyetherester which is esterified to the desired etherdiester by an acid anhydride. In this example a 14flask is fitted with a stirrer, thermometer, dropping funnel, and condenser with an attached nitrogen blanket. The flask is charged with 192 grams (6.0 moles) of methanol and 1 gram of pyridine as catalyst. To this stirred mixture, heated at 50°C., is added 204 grams (2.0 moles) of freshly distilled p-dioxan-2-one over a 30 minute period. The resulting reaction mixture is stirred for 30 hours at 50°C. after which excess methanol and pyridine are removed by evaporation in vacuo to give methyl beta-hydroxyethoxyacetate in a 93 percent yield. To this stirred product mixed with 1 gram of pyridine at 50°C. is slowly added 214 grams (2.1 moles) of acetic anhydride. After five hours the reaction mixture is submitted to fractional distillation at atmospheric pressure. The main fraction is methyl beta-acetoxyethoxyacetate which distills at 188°–190°C. Yield to this ether-diester from the hydroxyetherester is 90 percent. Saponification equivalent of product is analyzed to be 86.5 (theoretical is 88.1).

EXAMPLE 3

This example demonstrates the synthesis of an ether-diester by the reaction of p-dioxan-2-one with isobutanol to yield the hydroxyetherester which is esterified with carboxylic acid. The procedure in Example 1 is followed in this example by reaction of 192 grams (6.0 moles) of methanol with 204 grams (2.0 moles) of p-dioxan-2-one. The product, methyl beta-hydroxyethoxyacetate, is isolated in a 92 percent yield. Reaction of this product in 100 milliliters of benzene with 324 grams (2.0 moles) of n-butyric acid with 0.5 gram of para-toluenesulfonic acid catalyst is accomplished at reflux conditions. After collection of 18 milliliters of water, the reaction mixture is cooled and treated with 15 grams of sodium carbonate. After filtration and fractional distillation at reduced pressure the methyl 2-n-butyryloxyethoxyacetate is distilled at 105°–118°C. at 1 mm. mercury pressure in an 89 percent yield. Saponification equivalent of this product analyzes to be 100 (theoretical is 102).

EXAMPLE 4

This example demonstrates the use of an aliphatic alcohol, acid anhydride, and p-dioxan-2-one to produce an ether-diester. The procedure in Example 1 is followed. Isobutanol (370 grams, 5.0 moles) is reacted with 204 grams (2.0 moles) of p-dioxan-2-one at 75°C. to give a 91 percent yield to the isobutyl beta-hydroxyethoxyacetate. This hydroxyetherester is reacted with 324 grams (2.0 moles) of n-butyric anhydride at 75°C. for 5 hours. Fractional distillation at 2 mm. mercury pressure results in the isolation of isobutyl beta-n-butyryloxyethoxyacetate at 124°–127°C. in an 89 percent yield. Structural determination verifies the formation of the desired ether-diester. Saponification equivalent analysis is 60 (theoretical is 61.5).

EXAMPLE 5

This example demonstrates the diversity in the synthesis of ether-diesters by reactions of p-dioxan-2-one, butanol, and 2-ethylhexanoic anhydride. The procedure in Example 1 is followed in this preparation. To 370 grams (5.0 moles) of n-butanol at 75°C. is slowly added 102 grams (1.0 mole) of p-dioxan-2-one. After 5 hours the excess butanol is removed by evaporation at reduced pressure. To the residual product is added 297 grams (1.1 moles) of 2-ethylhexanoic anhydride. After this stirred mixture is heated at 100°C. for 6 hours, the mixture is distilled at reduced pressure to give an 87 percent yield of n-butyl 2-(2-ethylhexyryloxy)ethoxyacetate, boiling point is 153°–154°C. at 1 mm. mercury pressure. Saponification equivalent analysis is 148.6 (theoretical is 150.5). Infrared spectroscopy verifies the ether-diester synthesis.

EXAMPLE 6

This example further demonstrates the diversity in the synthesis of the ether-diesters by reactions of p-dioxan-2-one with higher molecular weight alcohols and acids or acid anhydrides. The procedure in Example 1 is followed in this reaction. To 260 grams (2.0 moles) of 2-ethylhexanol at 100°C. with one gram of tributylamine is slowly added 102 grams (1.0 mole) of p-dioxan-2-one. After 8 hours the excess alcohol and catalyst are removed by distillation at reduced pressure. To the residual product is added 297 grams (1.1 moles) of 2-ethylhexanoic anhydride. After this stirred mixture is heated at 100°C. for 6 hours, the mixture is distilled to give an 84 percent yield of 2-ethylhexyl 2-(2-ethylhexyryloxy)ethoxyacetate with a boiling point of 167°–169°C. at 1 mm mercury pressure. Saponification equivalent analysis is 177.2 (theoretical is 179). Infrared and nuclear magnetic resonance spectroscopy verifies the ether-diester synthesis.

EXAMPLE 7

This example demonstrates the use of an aliphatic alcohol, p-dioxan-2-one and an aromatic acid to produce an ether-diester. The procedure in Example 1 is followed. Isobutanol (148 grams, 2.0 moles) is reacted with 102 grams (1.0 mole) of p-dioxan-2-one at 75°C. to give a 92 percent yield to the isobutyl beta-hydroxyethoxyacetate. This hydroxyetherester is reacted with 122 grams (1.0 mole) of benzoic acid in 50 milliliters of toluene and 0.3 gram of p-toluenesulfonic acid catalyst. After removal of 18 milliliters of water, the reaction mixture is cooled and treated with 10 grams of calcium carbonate to neutralize acidic residues. After filtration and fractional distillation at reduced pressure the isobutyl benzoyloxyethoxyacetate product is isolated in an 86 percent yield. Saponification equivalent analysis of the viscous, semisolid colorless product is 138.5 (theoretical is 140). Infrared and nuclear magnetic resonance spectroscopy verifies the ether-diester synthesis.

The invention has been described in detail with particular reference to preferred embodiments thereof, but it will be understood that variations and modifications can be effected within the spirit and scope of the invention as described hereinabove.

We claim:

1. A compound having the formula

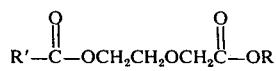

wherein R is alkyl of from 1 to 8 carbon atoms and R' is alkyl of from 1 to 7 carbon atoms.

2. The ether-diester in claim 1 wherein R is $CH_3$ and R' is $-C_4H_9$.

3. The ether-diester in claim 1 wherein both R and R' are $-C_4H_9$.

4. The ether-diester in claim 1 wherein R is $-C_4H_9$ and R' is $-C_7H_{15}$.

5. The ether-diester in claim 1 wherein R is $C_8H_{17}$ and R' is $C_7H_{15}$.

6. The ether-diester in claim 1 wherein R is $-C_4H_9$ and R' is phenyl.

7. A process for the production of ether-diesters having the formula

wherein R is alkyl of from 1 to 8 carbon atoms and R' is alkyl of from 1 to 7 carbon atoms or the phenyl moiety, which comprises reacting p-dioxan-2-one with an aliphatic alcohol having from 1 to 8 carbon atoms and subsequently esterifying the reaction product with an aliphatic carboxylic acid having from 2 to 8 carbon atoms or benzoic acid or an anhydride thereof.

8. A process according to claim 7 wherein the alcohol is selected from the group consisting of methanol, ethanol, propanol, n-butanol, isobutanol, 2-methylpentanol-1, n-hexanol, 2-ethylhexanol-1, n-octanol, allyl alcohol, and crotonyl alcohol.

9. A process according to claim 7 wherein the reaction of the p-dioxanone and alcohol is conducted in the presence of a catalyst.

10. A reaction according to claim 9 wherein the acid or base catalyst is selected from the group consisting of sulfuric acid, p-toluenesulfonic, organotin compounds, alkali metal hydroxides, pyridine, aliphatic tertiary amines, or N,N-dialkylanilines.

11. A reaction according to claim 9 wherein the catalyst is present in a concentration of from about 0.01 percent to about 2.0 percent based upon the total weight of the reactant.

12. A process according to claim 7 wherein the reaction of p-dioxanone and alcohol is conducted at a temperature from about 50°C. to 150°C.

13. A process according to claim 7 wherein the mole ratio of alcohol to p-dioxanone is from about 1:1 to about 15:1, respectively.

14. A process according to claim 13 wherein the mole ratio of alcohol to p-dioxanone is from about 2:1 to about 7:1, respectively.

15. A process according to claim 7 wherein the esterification reaction is conducted with a carboxylic acid selected from the group consisting of acetic, butyric, 2-methylpentanoic, hexanoic, 2-ethylhexanoic, octanoic, and benzoic acid.

16. A process according to claim 15 wherein the esterification is conducted in the presence of a catalyst selected from the group consisting of methanesulfonic, toluenesulfonic, sulfuric, phosphoric, or hydrochloric acid.

17. A process according to claim 16 wherein an esterification catalyst is present in an amount of from about 0.01 weight percent to about 1.0 weight percent based upon the total weight of the reactants.

18. A process according to claim 7 wherein the esterification reaction is conducted with an acid anhydride selected from the group consisting of acetic, butyric, 2-methylpentanoic, hexanoic, 2-ethylhexanoic, octanoic and benzoic anhydride.

19. A process according to claim 18 wherein the esterification is conducted at a temperature of from about 50°C. to about 150°C.

20. A process according to claim 15 wherein the esterification reaction is conducted at a temperature of from about 75°C. to about 200°C.

21. A process according to claim 7 wherein the mole ratio of intermediate hydroxylated ester to acid moiety is from about 1:1 to about 1:3.0, respectively.

* * * * *